3,264,317
1-SUBSTITUTED TRIAZOLIDINETRIONES AND THEIR PREPARATION

Paul J. Stoffel, St. Louis, Mo., assignor to Monsanto Company, a corporation of Delaware
No Drawing. Filed Sept. 23, 1963, Ser. No. 310,854
18 Claims. (Cl. 260—307)

This invention relates to a novel chemical process and to new compounds prepared thereby. The new compounds are biological toxicants useful in the control of undesired plants and objectionable microorganisms. The compounds are also useful intermediates in the preparation of derivatives which are useful herbicides.

The new chemical procedure may be defined structurally by the equation:

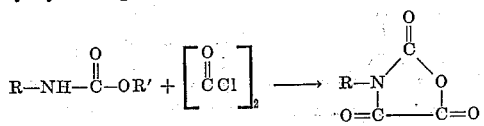

wherein R is selected from the class consisting of hydrocarbon radicals of the class consisting of alkyl having up to 12 carbon atoms, alkenyl having up to 12 carbon atoms, benzyl, phenyl and cycloalkyl having from four to seven carbon atoms; and the said hydrocarbon radicals having up to four substituents of the class consisting of nitro, chlorine, bromine, alkyl having up to four carbon atoms, alkoxy having up to four carbon atoms and phenyl; and wherein R' is a radical selected from the class consisting of secondary alkyl having from 3 to 8 carbon atoms, tertiary alkyl having from four to eight carbon atoms and cycloalkyl having from four to eight carbon atoms.

The reaction involves the liberation of a radical of physical characteristics defined above as R' and the cyclization with oxalyl chloride to form the new cyclic anhydrides. Preferred practice involves the reaction of carbamic acid esters with oxalyl chloride. Suitable carbamic acid esters include:

Isopropyl N-3,4-dichlorocarbanilate
t-Butyl N-methylcarbamate
Cyclohexyl N-carbanilate
t-Amyl N-cyclopentylcarbamate
Sec-butyl N-isopropylcarbamate and others defined above as

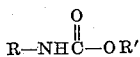

Useful cyclic anhydrides can be prepared reacting oxalyl chlorides with isopropyl esters of N-substituted carbamic acids to prepare new compounds of the following structures:

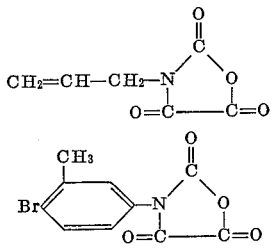

The reaction between oxalyl chloride and the defined carbamic acid esters in approximately equimolar proportions are effected by mixing in a suitable inert solvent such as benzene, toluene, chlorobenzene, dichlorobenzene, chlorotoluene, xylene or other solvent for the reactants, and heated at 30 to 180° C. and preferably at the reflux temperature to effect the reaction. After substantial completion of the reaction, the reaction mixture is a solution in the aromatic solvent medium. By the addition of a non-solvent for the product which is miscible in the medium, for example n-hexane, the product is precipitated. The solid product is separated by filtration and may, if desired, be purified by recrystallization from a suitable solvent, for example, acetone.

The resulting products do not contain the R' radical, the esterifying group of the carbamic acid, and cannot be prepared from primary alcohols. In order to be eliminated in the course of the reaction of the reaction, the esterifying group must have at least two hydrocarbon substituents on the alpha carbon atom.

Further details of the synthesis of the new compounds and their identification are set forth in the following examples.

Example 1

A slurry of 49.6 grams of isopropyl 3,4-dichlorocarbanilate and 24 grams of oxalyl chloride in 50 ml. of toluene was heated at reflux temperature for six hours. The reaction mixture was cooled and 300 ml. of hexane were added. The product which was precipitated was separated by filtering the reaction mixture and the crude product was dissolved in a minimum amount of acetone and the solution was added with stirring to 300 ml. of boiling tetrachloride. Upon cooling the resulting solution, a product crystallized and was identified as 3(3-dichlorophenyl)oxazolidinetrione (M.P. 175° C.).

Example 2

The procedure of the preceding example was repeated except that cyclohexyl carbanilate was used in place of isopropyl 3,4-dichlorocarbanilate. The product recovered was found to have a melting point of 137° C. and was identified as 3-phenyloxazolidinetrione.

Example 3

Using the procedure of the preceding examples, t-butyl 3-nitrocarbanilate was reacted with approximately equimolar proportions of oxalyl chloride to form a product with a melting point of 177.6–178.4° C. which was identified as 3(4-nitrophenyl)oxazolidinetrione.

Example 4

The reaction of cyclohexyl 3(4-ethoxy)carbanilate with equimolar proportions of oxalyl chloride produced a solid composition identified as 3(4-ethoxy)oxazolidinetrione.

Example 5

The procedure of the preceding example was duplicated except that sec-butyl 3(3-chloro)carbanilate was used in place of t-butyl 3((4-ethoxy)carbanilate. The resulting product had a decomposition point of 74° C. and was identified as 3(3-chlorophenyl)oxazolidinetrione.

Example 6

Oxalyl chloride and cyclobutyl N-3,4-dichlorobenzylcarbamate were heated in chlorotoluene at the reflux temperature for 8 hours. The resulting product (M.P. 126–128° C.) was identified as a compound of the structure:

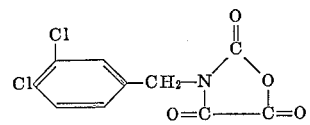

Example 7

A mixture of sec-butyl N-methylcarbamate and a slight excess of oxalyl chloride were added to xylene and the mixture heated at reflux temperature for five hours. The product precipitated by the addition of petroleum ether was separated and identified as a compound of the structure:

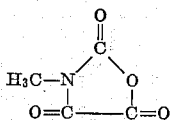

Example 8

A benzene solution of t-butyl cyclohexylcarbamate was treated by the gradual addition of a stoichiometric quantity of oxalyl chloride. After refluxing for three hours the product was separated from the solvent medium. The resulting product was N-cyclohexyloxazolidinedione.

Although the invention is described with respect to specific modifications, it is not intended that the details thereof shall be limitations on the scope of the invention except to the extent incorporated in the following claims.

What is claimed is:

1. A compound of the formula:

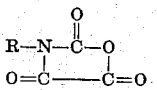

wherein R is selected from the class consisting of hydrocarbon of tthe group consisting of alkyl having up to twelve carbon atoms, phenyl, alkenyl of up to 12 carbon atoms, cycloalkyl having from 4 to 7 carbon atoms and benzyl; and the said hydrocarbon having up to four substituents of the class consisting of chlorine, bromine, alkyl of up to four carbon atoms, alkoxy of up to four carbon atoms and phenyl.

2. A method of preparing a compound of the formula:

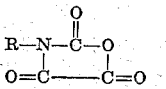

wherein R is selected from the class consisting of hydrocarbon of the group consisting of alkyl having up to twelve carbon atoms, phenyl, alkenyl of up to 12 carbon atoms, cycloalkyl having from 4 to 7 carbon atoms and benzyl; and the said hydrocarbon having up to four substituents of the class consisting of chlorine, bromine, alkyl of up to four carbon atoms, alkoxy of up to four carbon atoms and phenyl; which comprises contacting oxalyl chloride with a compound of the formula

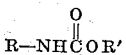

wherein R' is selected from the class consisting of secondary alkyl having from three to eight carbon atoms, tertiary alkyl having from four to eight carbon atoms, and cycloalkyl having from four to eight carbon atoms; and heating the said compounds at a temperature between 30° C. and 180° C. in an inert liquid medium.

3. N-phenyloxazolidinetrione.

4. The method of preparing N-phenyloxazolidinetrione which comprises refluxing oxalyl chloride and a secondary alkyl carbanilate having alkyl of three to eight carbon atoms in an aromatic solvent medium.

5. N-alkyloxazolidinetrione having up to 12 carbon atoms in the alkyl moiety.

6. The method of preparing an N-alkyloxazolidinetrione having up to 12 carbon atoms in the alkyl moiety which comprises refluxing a secondary alkyl N-alkylcarbamate with oxalyl chloride in an aromatic solvent medium, said secondary alkyl radical having from three to eight carbon atoms.

7. N-cycloalkyloxazolidinetrione having from four to seven carbon atoms in the cycloalkyl moiety.

8. The method of preparing an N-cycloalkyloxazolidinetrione having from four to seven carbon atoms in the cycloalkyl moiety which comprises refluxing in an aromatic solvent meduim oxalyl chloride and a tertiary alkyl N-cycloalkylcarbamate wherein the tertiary alkyl radical has from four to eight carbon atoms.

9. N-methyloxazolidinetrione.

10. The method of preparing N-methyloxazolidinetrione which comprises heating oxalyl chloride and isopropyl N-methylcarbamate in an aromatic hydrocarbon at a temperature of 30 to 180° C.

11. N-(3,4-dichlorophenyl)oxazolidinetrione.

12. The method of preparing N-(3,4-dichlorophenyl)-oxazolidinetrione which comprises heating oxalyl chloride and isopropyl N-3,4-dichlorocarbanilate in an aromatic hydrocarbon at a temperature of 30 to 180° C.

13. N-ethyloxazolidinetrione.

14. The method of preparing N-ethyloxazolidinetrione which comprises heating oxalyl chloride and t-butyl N-ethylcarbamate in an aromatic hydrocarbon at a temperature of 30 to 180° C.

15. N-(n-propyl)oxazolidinetrione.

16. The method of preparing N-(n-propyl)oxazolidinetrione which comprises heating oxalyl chloride and cyclohexyl N-(n-propyl)carbamate in an aromatic hydrocarbon at a temperature of 30 to 180° C.

17. N-benzyloxazolidinetrione.

18. The method of preparing N-benzyloxazolidinetrione which comprises heating oxalyl chloride and sec-butyl N-benzylcarbamate in an aromatic hydrocarbon at a temperature of 30 to 180° C.

References Cited by the Examiner

Burger, Medical Chemistry (New York, 1960), pages 77–81.

HENRY R. JILES, *Primary Examiner.*

ALTON D. ROLLINS, *Assistant Examiner.*